United States Patent [19]

Yabu et al.

[11] 3,898,695

[45] Aug. 5, 1975

[54] APPARATUS FOR RECORDING AND PRODUCING AUDIO AND VIDEO SIGNALS EMPLOYING CARTRIDGE AND CARRIAGE MOVEMENT DETECTING MEANS

[75] Inventors: Toshiomi Yabu, Kyoto; Yoshiaki Hayashi, Takatsuki; Toshiji Kanamaru; Hideki Sakumoto, both of Katano; Hiroo Hosono, Hirakata, all of Japan

[73] Assignee: Matsushita Electric Industrial Co., Ltd., Kadoma-shi, Japan

[22] Filed: Dec. 26, 1973

[21] Appl. No.: 427,723

[30] Foreign Application Priority Data

Dec. 29, 1972 Japan .................................. 48-3642

[52] U.S. Cl. .................... 360/85; 242/195; 360/74; 360/95

[51] Int. Cl. .. G11b 15/66; G11b 5/52; G11b 15/22

[58] Field of Search ................... 360/85, 71, 74, 95; 242/186, 188–190, 197–198, 195, 192; 226/91, 92

[56] References Cited

UNITED STATES PATENTS

| | | | |
|---|---|---|---|
| 3,665,114 | 5/1972 | Hathaway | 360/85 |
| 3,688,059 | 8/1972 | Miura | 360/85 |
| 3,697,679 | 10/1972 | Hathaway | 242/192 |
| 3,783,200 | 1/1974 | Jantzen et al. | 360/85 |
| 3,792,491 | 2/1974 | Inaga | 242/195 |
| 3,818,503 | 6/1974 | Hosono et al. | 360/85 |

*Primary Examiner*—Raymond F. Cardillo, Jr.
*Attorney, Agent, or Firm*—Stevens, Davis, Miller & Mosher

[57] ABSTRACT

An apparatus for recording and reproducing audio and video signals, which is adapted to receive a cartridge including therein a reel around which is wound a magnetic tape having at a leading end a tape leader. The magnetic tape is threadedly preceded by the tape leader along a predetermined running path toward a system for delivering the magnetic tape and a group of transducers including rotary transducer heads to thereby enable the magnetic tape to be recorded and reproduced. The apparatus comprises a carriage for delivering the cartridge to a playing position, a mechanism for feeding the tape leader and a driving source for the feeding mechanism. Control is provided such that the feeding mechanism is positioned in its operating mode in accordance with the detecting operations of a first mechanism for detecting that the cartridge is received into the carriage and a second mechanism for detecting that the carriage means is delivered from a non-playing position to the playing position. The apparatus further comprising a reset mechanism, whereby the second detecting mechanism after detecting the movement of the carriage mechanism is released to return the second detecting means to the original condition.

6 Claims, 30 Drawing Figures

PATENTED AUG 5 1975 3,898,695

SHEET 5

PATENTED AUG 5 1975 3,898,695

SHEET 6

APPARATUS FOR RECORDING AND PRODUCING AUDIO AND VIDEO SIGNALS EMPLOYING CARTRIDGE AND CARRIAGE MOVEMENT DETECTING MEANS

This invention relates to an appratus of the so-called self-threading type for recording and rerproducing audio and video signals which uses a cartridge including therein a reel around which is wound a magnetic tape having a tape leader at its leading end. The magnetic tape is automatically threaded, preceded by the tape leader from the cartridge, along a predetermined path.

Particularly, the present invention presents an apparatus for recording and reproducing audio and video signals which has a self-threading function optimized for charging the cartridge and wherein a carriage means is utilized. The carriage means is so arranged that the cartridge is received at a non-playing position, and the cartridge moved to a playing position to thereby charge the cartridge under a predetermined condition.

The apparatus for recording and reproducing autio and video signals, according to the present invention, is so arranged that the apparatus is not provided with an operating means such as a button or lever for starting the self-threading from outside in order to simplify the operation and construction of the apparatus start of the self-threading is controlled by charging the cartridge into the playing position.

It is accordingly a principle object of the present invention to provide a means for optimizing control of the self-threading function for starting the self-threading operation upon charging the cartridge into the playing position.

The present invention uses as a prerequisite the detection of the shifting of the aforesaid carriage means from the non-playing position to the playing position for commencing the self-threading operation in association with the charging of the cartridge in the playing position. Since the transfer or shifting of the carriage is effected only upon charging of a cartridge, if the detecting means for detecting the aforesaid shifting of the carriage is reset in association with the controlling operation given at the time of completion of the threading operation, the threading may be directly commenced at any time, if desired, unless the cartridge is re-loaded. This provides a threading control having considerable convenience and simplicity. However, if the aforesaid shifting is not so designed as to be detected upon its completion, there is the danger that threading will be started, before the cartridge has not been set in playing position, completely. However, difficulties are encountered with the detection of shifting of the carriage in association with timing of completion of shifting, because the detecting means must be extremely closely adjusted.

Accordingly, it is a further object of the invention to provide positive and simple detecting means for such controlling that the threading operation is not started, before the loading of a cartridge has not been completed.

When the magnetic tape is set in a predetermined position due to the threading operation, then the threading operation should be stopped.

Accordingly, it is a still further object of the invention to provide a control means adapted to stop the threading operation, while minimizing the use of additional factors.

It is still further object of the invention to provide means for preventing a rotary head from being subjected to a damage by using a tape leader made of a material being different from that of the magnetic tape.

It is a further object of the invention to provide a control mechanism adapted to enable undesirable interference in N tape running system to be prevented, said mechanism bringing into an inoperative condition the external operating means for operating the recording and reproducing operation from outside, during threading operation.

According to the present invention, there is provided an apparatus for recording and reproducing audio and video signals which therein receives a cartridge housing a reel which is wound therearound with a magnetic tape having the leading end bonded to a leader tape, and in which said magnetic tape threads under the guidance of said leader tape through a predetermined path running through a magnetic tape transfer system and a group of transducers including rotating heads, thereby providing a recording reproducible condition, said apparatus comprising:

a. carriage means which is movable between a non-playing position and a playing position, and receives said cartridge in said non-playing position and makes the cartridge thus received engage with a turntable for a supply reel by shifting said cartridge to said playing position;

b. cartridge detecting means for detecting the reception of said cartridge in said carriage means;

c. shifting movement detecting means for detecting the shifting movement of said carriage from said non-playing position to said playing position;

d. a leader tape pay-out mechanism for rotatably driving said supply reel so as to pay out said leader tape outside of said cartridge, said mechanism being capable of assuming an operative position, in which said mechanism abuts on said turntable for said supply reel and is permitted to rotate said turntable, and of assuming an inoperative position, in which said mechanism is retracted from said turntable and is not permitted to rotate said turntable;

e. a power source for supplying driving power to said leader tape pay-put mechanism;

f. leader tape pay-out mechanism control means which controls the position of said leader tape pay-out mechanism in response to the conditions detected by said cartridge detecting means and said shifting movement detecting means, and which brings said leader tape pay-out mechanism to said operative position only when said cartridge detecting means detects the reception of said cartridge in said carriage means and also said shifting movement detecting means detects the shifting movement of said carriage from said non-playing position to said playing position; and g. resetting means for cancelling the conditions of said shifting movement detecting means in the case where the shifting movement of said carriage is detected, and reset said detecting means to the conditions prior to detecting said shifting movement.

The present invention will be described in further detail hereunder with reference to the accompanying drawings, in which:

FIG. 30 is a diagram showing one example of a circuit for preventing an included battery from being overdischarged.

The description will not be given to one embodiment of the invention with reference to the accompanying drawings.

Figure 1:
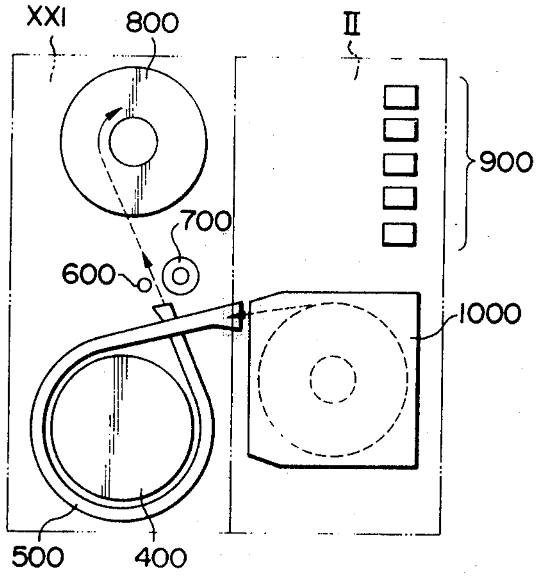
FIG. 1 is a diagramatical plan view of a twohead type video tape recorder using devices according to the present invention.

Referring now to FIG. 1, which is a plan view showing the outline of the first embodiment of the invention, shown at 1000 is a cartridge type tape supply reel means, which houses therein a cartridge incorporating a reel wound therearound with a magnetic tape having as its leading end a leader tape which is stiffer than the magnetic tape. The tape supply reel is rotated in one direction; the tape leader is fed in the direction indicated by the arrows; the tape leader is introduced into a leader guide 500 which surrounds a periphery portion of a head cylinder assembly 400 having magnetic transducer heads; the tape leader is passed between a capstan 600 and a pinch roller 700; the tape leader is taken up on a tape take-up reel means 800. Designated at 900 is an operating button group.

Figure 2:
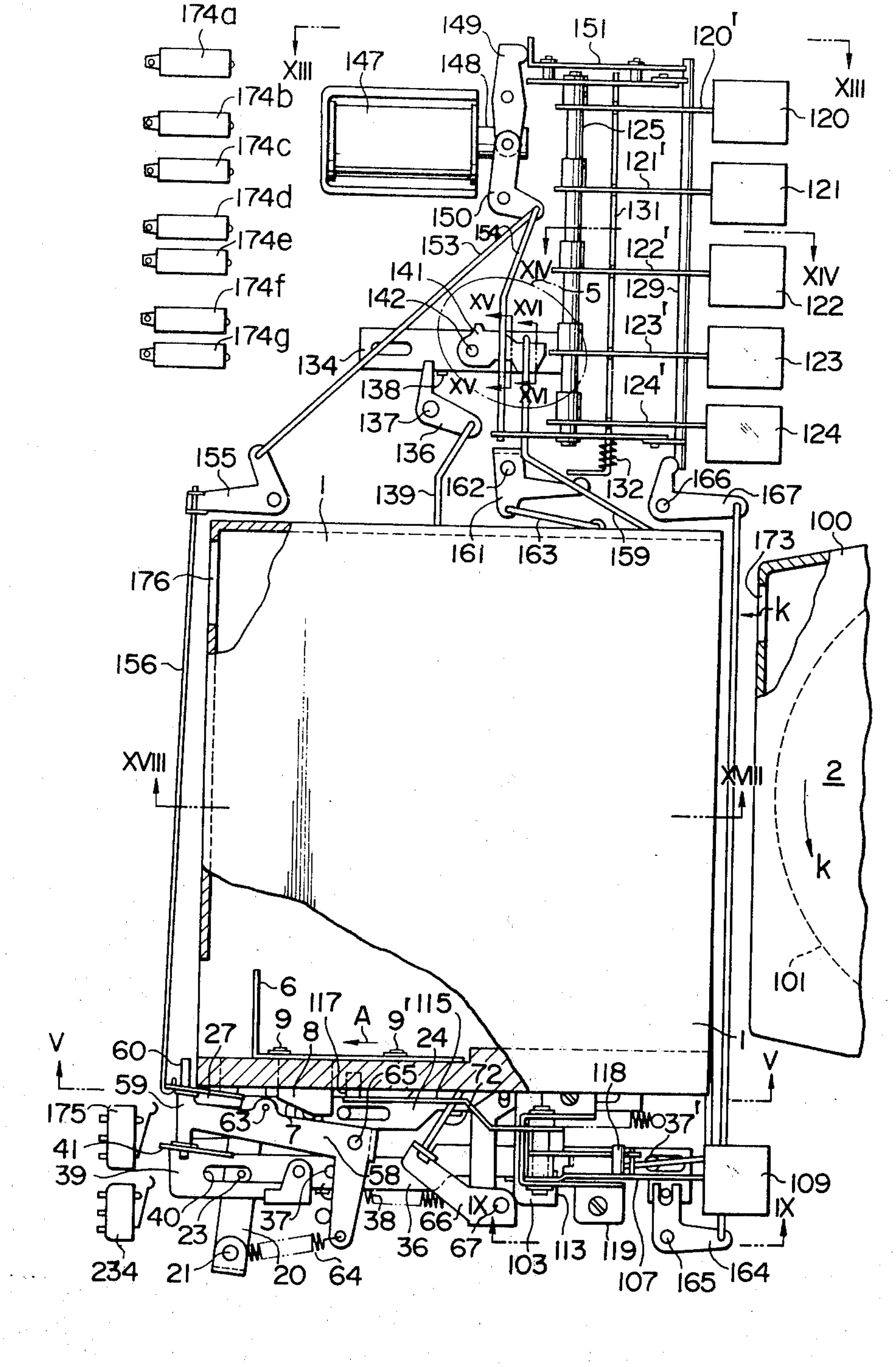
FIG. 2 is a plan view, partially broken-away, of a portion encompassed with a phantom line II of FIG. 1.
Figure 4:
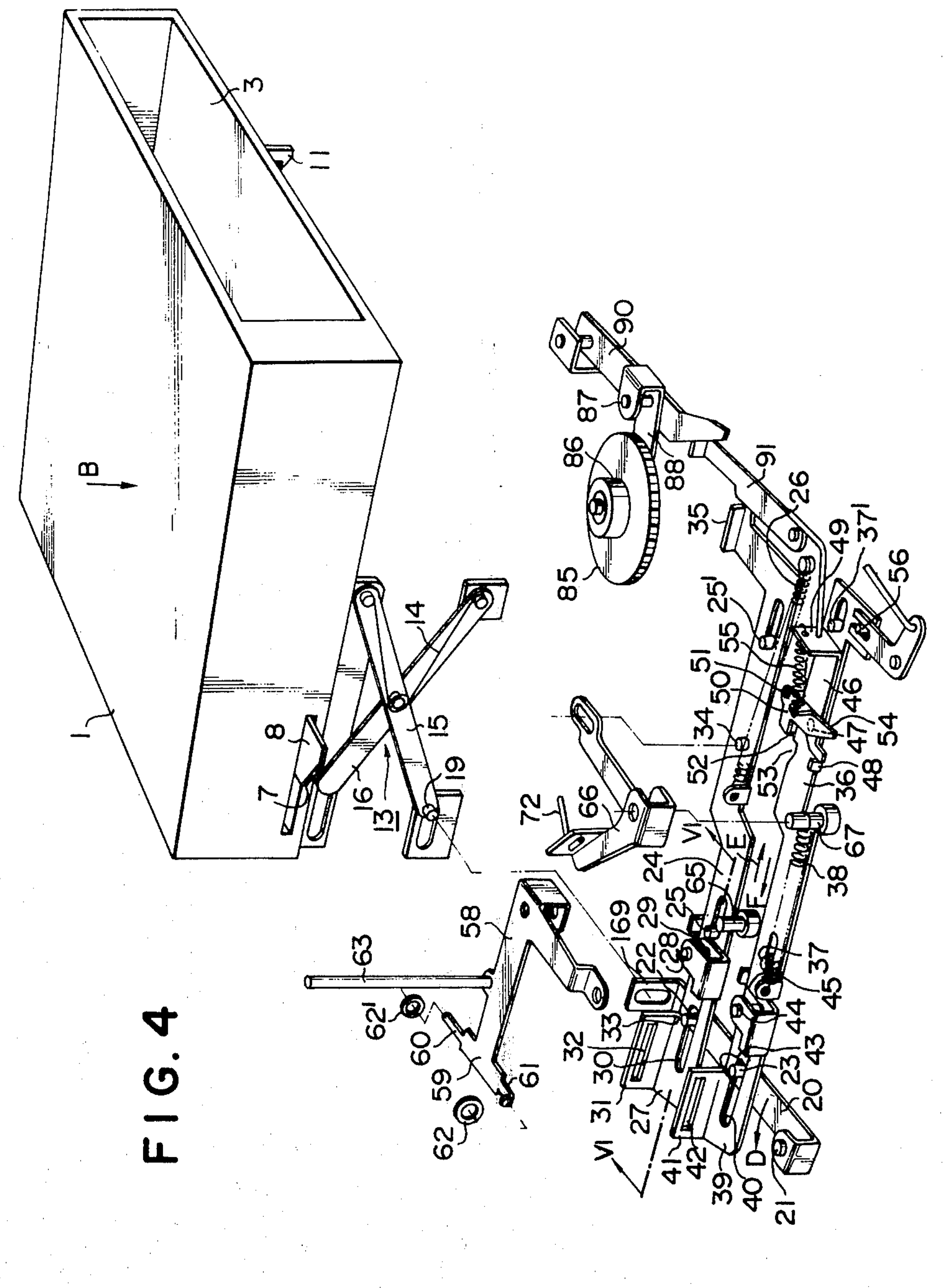
FIG. 4 is an exploded, perspective view of the essential part.
Figure 5:
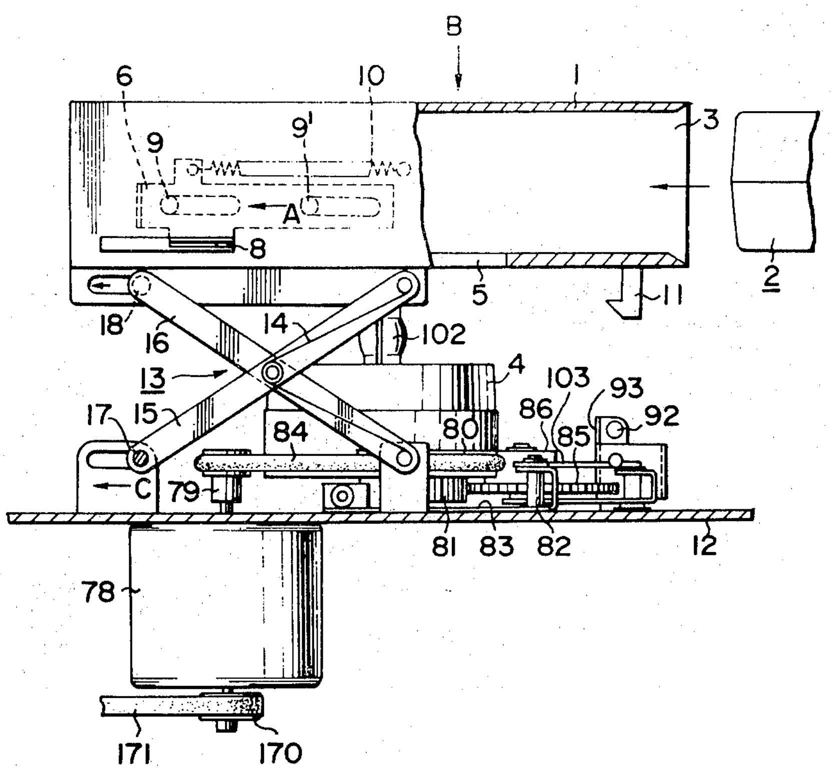
FIG. 5 is a cross-sectional view taken along the line V—V of FIG. 2.
Figure 6:
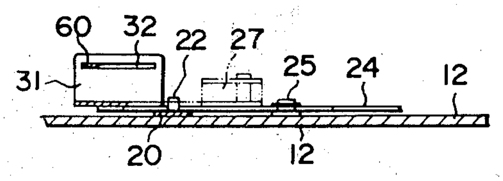
FIG. 6 is a cross-sectional view taken along the line VI—VI of FIG. 4.
Figure 7:
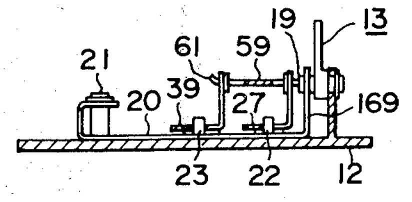
FIG. 7 is a cross-sectional view taken along the line VII—VII of FIG. 3.

Referring to FIGS. 2 to 18, a description will be given of the detailed construction of the portion encompassed with a phantom line II of FIG. 1. Shown at 1 is a cartridge casing which has at one end an opening 3 for inserting the cartridge, an opening 176 for feeding the tape as shown in FIG. 2, and a throughhole 5 having a diameter greater than that of a turntable 4 provided in the undersurface of the casing. Shown at 6 is an "L"-shaped sliding lever which is used for detecting a cartridge. The lever is provided on the internal wall of said cartridge casing 1, said lever having a cam piece 8 partly defining an inclined cam surface 7 thereon and being externally exposed from the cartridge casing 1. The sliding lever 6 used for detecting a cartridge is adapted to slidably move in an arrowed direction A, while the slot defined in said lever is in engagement with pins 9, 9′ provided on the wall of casing 1. The lever 6 is urged under the action of a spring 10 toward the opening 3 for inserting a cartridge therein. Shown at 11 is a locking piece provided on the undersurface of said casing 1. The casing 1 is mounted on the upper portion of the turntable 4 and is linked through a pantograph mechanism 13 to a base plate 12. Casing 1 and pantograph 13 comprise a carriage means, for transferring a cartridge from the non-playing position to the playing position. The carriage means is normally lifted up by the action of a spring 14 provided on the pantograph mechanism toward the non-playing position (as shown in FIG. 5). The pantograph mechanism is well known in the art and hence a detailed description is omitted. However, when the upper surface of casing 1 is pushed in an arrowed direction B, then the casing will descend in parallel to the base plate against the spring action of the spring 14, while the end portions 17, 18 of a lever 15 slide in the direction of C, said levers 15, 16 forming the pantograph mechanism. Provided on the end portion 17 of the lever 15 is a columnar projection 19 (See FIG. 4).

Shown at 20 is a main lever for operating a loading mechanism, one end of said lever 20 being pivotally mounted on a pivot 21 and the other end thereof being in engagement with said columnar projection 19. Thus, when the casing 1 is depressed in the arrowed direction B, the projection 19 will be slided in the arrowed direction C, whereby the main lever 20 will be pivoted in an arrowed direction D, as shown in FIG. 4.

Two upright pins 22 and 23 are provided on the main lever 20. Shown at 24 is a first sliding plate which can slide along pins 25, 25′ and is normally urged in an arrowed direction E under the action of a tension coil spring 26. An auxiliary lever 27 is pivotally mounted on a pivot 28 at one end portion of said first sliding plate 24, and is normally urged under the action of a spring 29 in a counterclockwise direction. This auxiliary lever 27 is formed with a 'U' shaped cutout portion 30 and an angled protion 31 which has an elongated slot 32 therein. On the other hand, a 'V'-shaped projection 33 is formed by the angled portion 31 and the 'U'-shaped cutout portion 30. An upright pin 34 is provided on the first sliding plate 24 separated from said auxiliary lever 27 lever 27 being formed with an angled portion 35 on one end thereof opposite to the attaching position of said lever 27.

Shown at 36 is a second sliding plate which is adapted for sliding along pins 37, 37′ is parallel with the first sliding plate 24. Plate 36 is normally urged under the action of a spring 38 in the arrowed direction E. Provided on the second sliding plate 36 is an auxiliary lever 39 similar in construction to the auxiliary lever 27 provided on the first sliding plate, and hence a description of the attaching means thereof is omitted. Shown at 40 is a 'U'-shaped cutout portion provided in said auxiliary lever 39, at 41 an angled portion, at 42 an elongated slot, at 43 a 'V'-shaped projection, at 44 a pivot and at 45 a spring.

Shown at 46 is a lever which is used for interrupting the movement of the cartridge ejecting mechanism (which will be described later). Lever 46 is pivotally mounted by means of a pivot 47 on the second sliding plate 36, while the stopper 48 provided on the second sliding plate restricts the clockwise rotation of said lever 46. This lever 46 for stopping the actuation of the ejecting mechanism is formed with an angled portion 49, which has a height of $h_1$. Shown at 50 is a locking lever pivotally mounted on the lever 46 by a pivot 51, said lever 50 having an 'L' shape and being urged normally in the counterclockwise direction under the spring action of a spring 55 secured between said levers 46 and 50. On one end of the 'L'-shaped lever 50, there is formed an angled portion 52, which is in contact with the side wall of the second sliding plate 36 to restrict the counterclockwise rotation of said lever 50.

Shown at 53 is a notch formed in the second sliding plate 36 which is adapted to engage with the angled portion 52. In other words, when the lever 46 is pivoted through a given angle form the position shown in FIGS. 3 and 4, then the angled portion 52 of the locking lever 50 will be in engagement with the notch portion 53, thereby locking the lever 46 in the position shown in FIG. 11. To release such a locking state, one end 54 of the locking lever 50 positioned opposite to the angled portion 52 is pushed to pivot the locking lever 50 in a clockwise direction, thus disengaging the angled portion 52 from the notch 53, while the lever 46 will be returned to its home position under the action of a spring 55 from the position shown in FIG. 11. Shown at 56 is an upright pin provided on one end of the second sliding plate 36. The first sliding plate 24 and the second sliding plate 36 are positioned above the main lever 20, while a pin 22 provided on the main lever 20 is extended through an elongated slot provided in the first sliding plate 24 to be in such positioning relationship that the pin 22 is projected in corresponding position to the 'U'-shaped cutout portion 30 in the auxiliary lever 27. Under such a condition, when the main lever 20 is pivoted in the arrowed direction D, then pins 22, 23 will be moved within the 'U'-shaped cutout portion, thus exerting no influence on the first and second sliding plates. However, when the auxiliary levers 27, 29 are pivoted through a given angle in the counterclockwise direction, then 'V'-shaped projections 33 and 43 will be opposite to the pins 22 and 23, respectively (See FIG. 8). Under such a condition, when the main lever 20 is pivoted in the arrowed direction D, then pins 22 and 23 will be abutted against the 'V'-shaped projections 33 and 43 of the auxiliary levers 27 and 39, thereby causing the first sliding lever 24 and the second sliding lever 36 to slide in the arrowed direction F.

Figure 8:
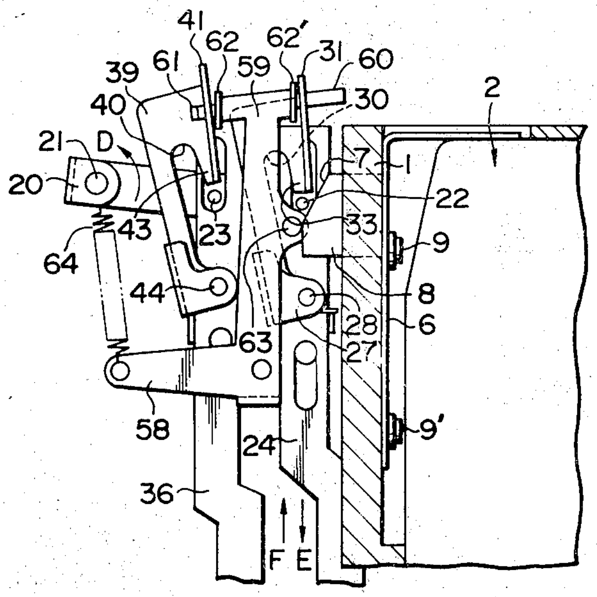
FIG. 8 is an enlarged plan view of the essential part.

Shown at 58 is a pivotable lever for detecting the cartridge, the lever 58 being pivotally mounted on a pivot 65. Formed on the tip of a 'T'-shaped arm 59 of the pivotable lever 58 are shouldered projections 60, 61, and the tip portion of the projection 61 is bent, (See FIG. 4). The projections 60 and 61 are inserted through washers 62, 62′ into the elongated slot 32, 42 in the auxiliary levers 27, 39, respectively (See FIGS. 3, 6 and 7). Provided in the center portion of the 'T'-shaped arm 59 is a post 63 having a length which covers the range from the ascending positon to the descending position of the cartridge casing, while the outer peripheral surface of the post 63 is in contact with the inclined cam surface 7 of the sliding lever 8 used for detecting the cartridge. Thus, when the lever 6 slides in the arrowed direction A, then the cam surface 7 will urge the post 63, and the pivotable lever 58 will be pivoted in the counterclockwise direction. The pivotable lever 58 is normally urged in such a manner to be pivoted in the clockwise direction by means of a spring 64. Thus, when the pivotable arm 58 is pivoted by means of the cam surface 7 against the action of the spring 64 in the counterclockwise direction, the auxiliary levers 27 and 39, as shown in the drawings, will be pivoted under the spring action of the springs 29 and 45 in the counterclockwise direction, so that, as shown in FIG. 8, the 'V'-shaped projections 33 and 43 of the auxiliary levers 27 and 39 will be brought to positions facing pins 22 and 23.

Shown at 66 is a 'V'-shaped lever pivotably mounted on a pivot 67, and one arm of the 'V'-shaped lever is in engagement with the pin 34 provided on the first sliding plate 24, so that the sliding movement of the sliding plate 24 in the arrowed direction F will pivot the 'V'-shaped lever 66 in the counterclockwise direction. Another arm of the 'V'-shaped lever is linked through a rod 72 to an arm 68 of a brake releasing lever 71 having radially extending arms 68, 69, 70, (See FIG. 3). The brake releasing lever 71 is pivotably mounted on a pivot 73.

Figure 3:
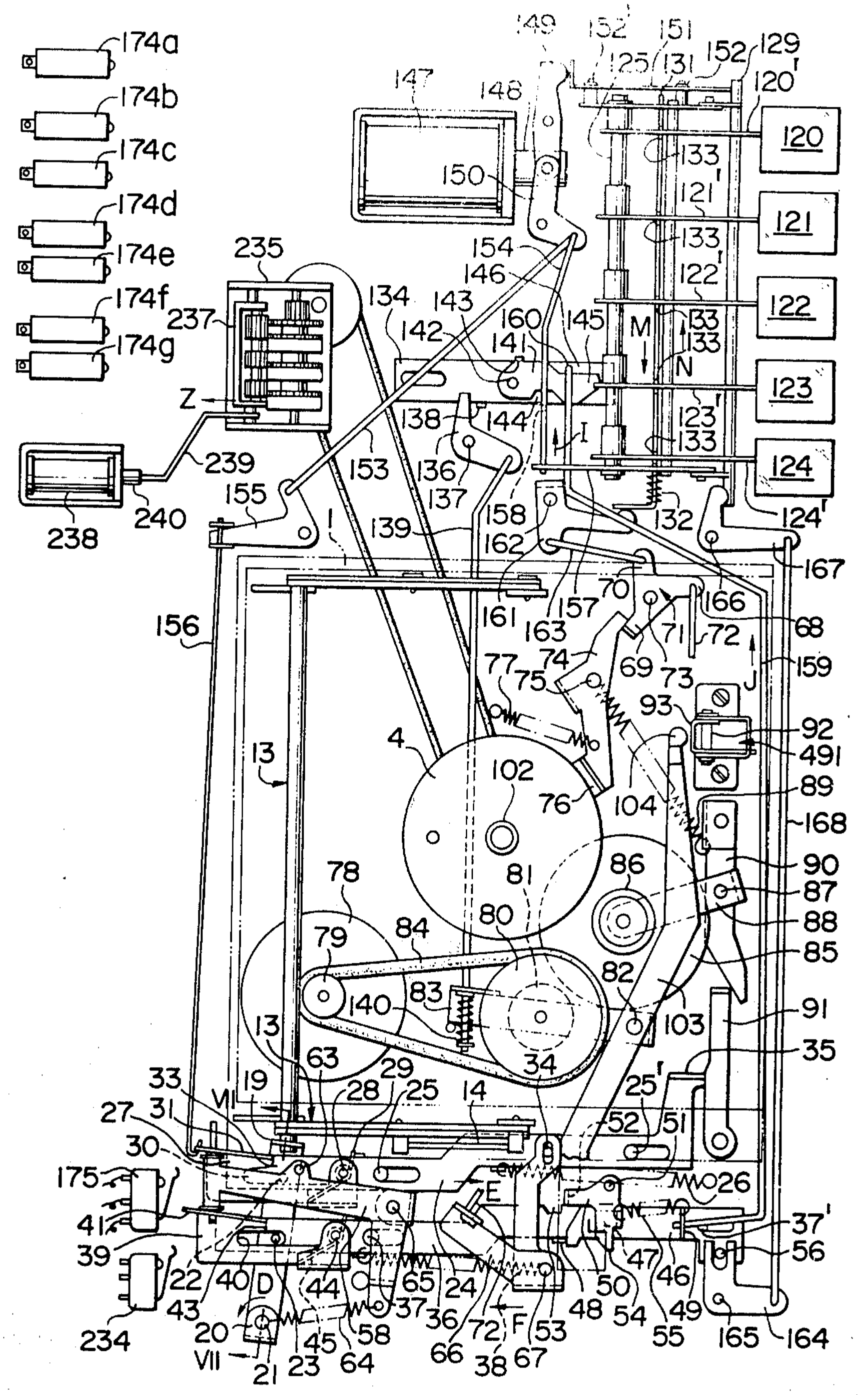
FIG. 3 is a plan view of FIG. 2 excluding a portion of the apparatus (the portion receiving a cartridge)

Shown at 74 is a brake lever which is pivotable about the pivot 75, a brake shoe 76 provided on one end thereof is normally urged against the outer peripheral surface of the turntable 4 by means of a spring 77, thereby restricting the rotation of the turntable 4. One end of the brake lever 74 opposite to the brake shoe 76 is positioned so as to be in contact with the arm 69 of the brake releasing lever 71, as shown in FIG. 3, so that the clockwise rotation of the brake releasing lever 71 will disengage the brake shoe 74 from the turntable 4.

Shown at 78 is a motor, at 79 a motor pulley, and at 80 a deceleration pulley. A spur gear 81 is mounted coaxially therewith, while the pulley 80 is rotatably mounted on a lever 83 which is pivotable about a pivot 82. A belt 84 having a circular cross section is trained between the motor pulley 79 and the deceleration pulley 80. The motor 78 is mounted on a base plate 12, and at the lower end of the motor shaft is mounted pulley 170, (See FIG. 5). A flat belt 171 is trained between the pulley 170 and the pulley mounted on a capstan shaft. Shown at 85 is a loading gear, and a rubber roller 86 is mounted coaxially therewith, said gear 85 being rotatably mounted on an arm 88 which is pivotable about the pivot 87. The gear 85 is in meshing relation with the spur gear 81 and the rubber roller 86 may be contacted with the outer peripheral surface of the turntable 4. The pivot 87 of the arm 88 is provided on a pivotable arm 90 which is urged by means of a spring 89 in the clockwise direction, said pivotable arm 90 being engaged through a pivotable lever 91 with the angled portion 35 of the first sliding plate 24 and being normally restricted from clockwise rotation by means of the restoring force of the first sliding plate 24 in the arrowed direction E, whereby the meshing of the spur gear 81 with the loading gear 85 as well as the contact of the rubber roller 86 with the turntable 4 are interrupted. However, when the first sliding plate 24 slides in the arrowed direction F, then the rotation of the arm is so initiated that the spur gear 81 is brought into meshing relation with the loading gear 85, while the rubber roller 86 will be into contact with the turntable 4, with the result that the power of the motor 78 will be transmitted to the turntable 4. The motor 78 is rotated in the counterclockwise direction.

Figure 18:
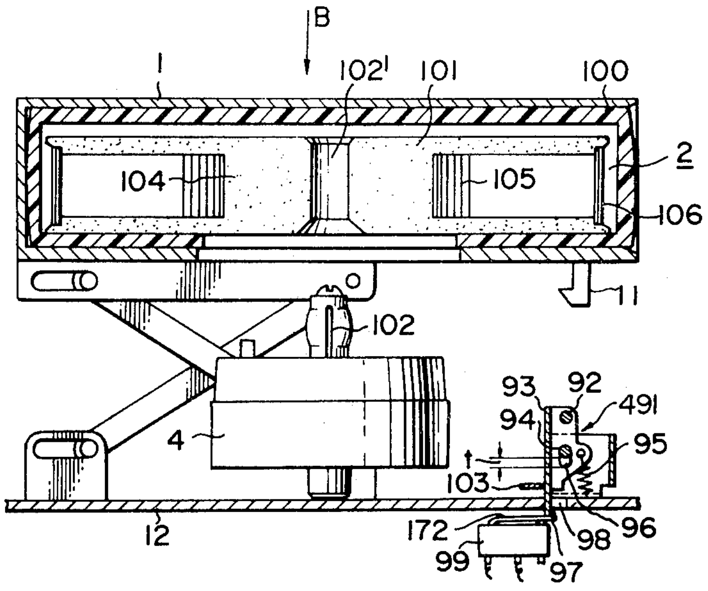
FIG. 18 is a cross-sectional view taken along the line XVIII—XVIII of FIG. 2, showing a cartridge mounting condition.
Figure 19:
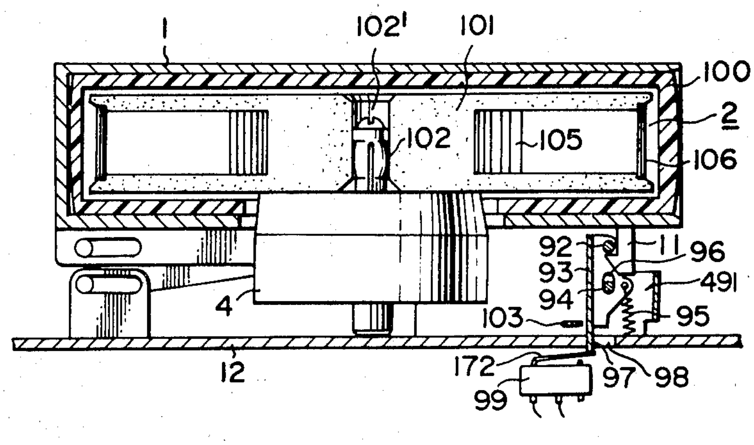
FIG. 19 is a cross-sectional view showing another operating condition of FIG. 18.

Shown at 491 is a locking mechanism for cartridge casing 1. A locking lever 93 having a pin 92 in parallel with the base plate 12 is pivotable about a pivot 94, as shown in FIG. 18, and is urged under the spring action of the spring 95 so as to be pivoted in the clockwise direction and to be urged downwardly. A slot 96 of the locking lever 93 receiving the pivot 94 therein is of an elongated shape, and is so arranged that after the cartridge casing 1 has been lowered and locking piece 11 provided on the undersurface of the casing 1 has engaged with the pin 92, the lever 93 will be moved upwardly by a distance $t$ which corresponds to the clearance provided in the slot 96 with respect to the pivot 94 therein. The locking lever 93 is formed with a tongue portion 97 at the lower portion thereof, said tongue portion being inserted in the elongated slot 98 provided in the base plate 12 to thereby restrict the clockwise rotation of the locking lever 98, with the tip of the tongue portion being in contact with the actuator 172 of a microswitch 99. Accordingly, when the cartridge casing 1 is in the upper position, then the actuator 172 is urged under the action of the spring 95. However, when the locking lever moves upwardly by the distance $t$, the actuator will be released from being urged and the microswitch will be switched over. For releasing the cartridge casing 1 from locking by means of locking lever 93 as shown in FIG. 19, the locking lever 93 may be forcedly pivoted in the counterclockwise direction. Then, the locking will be released, and the casing 1 will move upwardly under the action of the spring 14 of the pantograph mechanism.

Referring now to FIG. 18 which shows the construction of the cartridge 2, shown at 100 is a cartridge casing having a tape supply reel 101 therein. The tape supply reel 101 has a hole 102′ adapted to receive a reel shaft 102 therein, while upon a hub 104 is wound therearound a magnetic tape 105. Bonded to the leading end of the magnetic tape is a transparent tape leader 106 which is stiffer and wider than the magnetic tape, said tape leader 106 being wound around the reel. Likewise, a similar transparent tape is bonded to the other end of the magnetic tape. This type of cartridge is generally referred to as a single reel type cartridge. The winding direction of the magnetic tape is as shown by the arrow K in FIG. 2. The rotation of the reel in the counterclockwise direction will cause the tape leader to be fed through the opening 173 in the cartridge casing 100 in an arrowed direction K, then the tape leader 106 is introduced through a tape leader guide 500 as shown in FIG. 1 to be taken up by take-up reel 800.

The reel 101 is housed in the cartridge in loose condition. In other words, when the cartridge is completely charged, the reel 101 is held on the turntable 4, and hence the reel 101 shoudl be kept from being in contact with the cartridge casing 100. For this reason, there is provided an elongated slot for the pivot of the locking lever 93, whereby the lever is allowed to move a distance upwardly, after being locked. The reel shaft 102 is somewhat greater in diameter than the center hole of the reel and has resiliency, such that when the reel is fitted on the shaft 102, the reel may be positively held thereon due to its resiliency and frictional force. Accordingly, even if the turntable 4 is inverted through 180° from the position shown in FIG. 19, the reel will not be disengaged from the shaft 102. However, when the reel is pushed with a force of a magnitude which may overcome the aforesaid frictional force, then the reel may be disengaged from the reel shaft.

As best shown in FIG. 3, a lock releasing lever 103 for the locking lever 93 is pivotably mounted on the pivot 82, one end thereof being positioned so as to face the aforesaid locking lever 93, so that the clockwise rotation of the locking releasing lever 103 will cause the locking lever 93 to be pivoted against the spring action of the spring 95.

On the other hand, the other end 113 of the lock releasing lever 103 (FIGS. 9 and 10) is in engagement with a cartridge ejecting mechanism 106, and accordingly the lever 103 may be pivoted, by means of the operation of the ejecting mechanism, in the clockwise direction.

Figure 9:
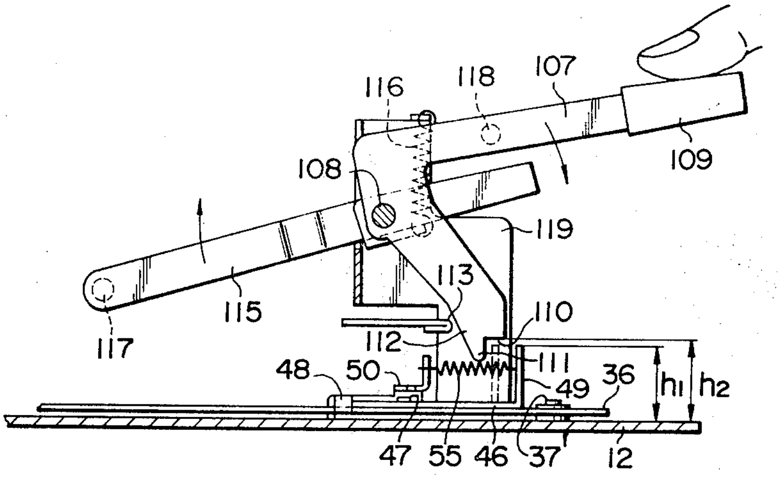
FIG. 9 is a cross-sectional view taken along the line IX—IX of FIG. 2.
Figure 10:
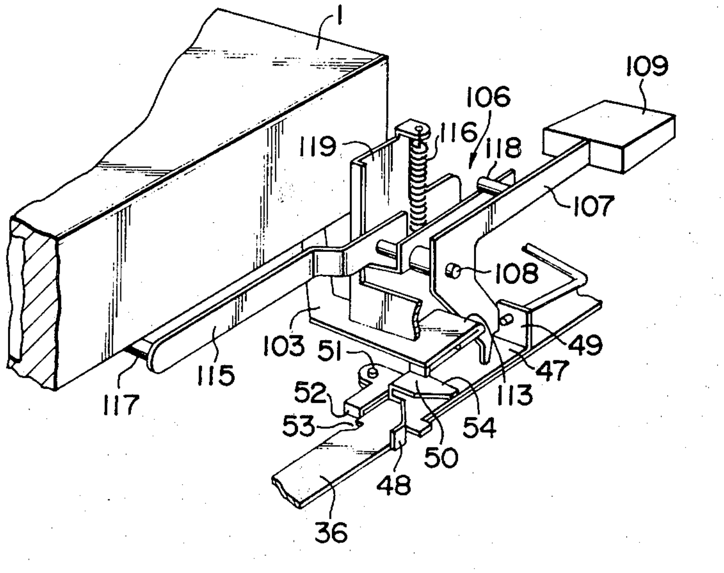
FIG. 10 is a perspective view of FIG. 9.
Figure 11:
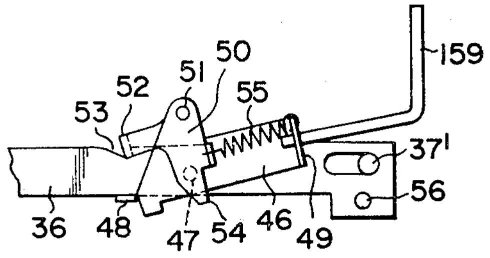
FIG. 11 is a plan view showing the essential part of FIG. 9.

Referring now to FIGS. 9 and 10 which show the construction of the ejecting mechanism 106, shown at 107 is an ejecting main lever pivotably mounted on a pivto 108, one end thereof being provided with a button 109 which is adapted to be depressed by an operator, and the other end thereof being provided with a 'V'-shaped projection 111 and an end face 110 in parallel to the base plate 12 (FIG. 9). The height $h_2$ of the end face 110 from the base plate 12 is somewhat greater than the height $h_1$ of the angled portion 49 of the aforesaid lever 49, so that, as shown in FIG. 9, when the angled portion 49 of the lever 46 is shifted from the solid line to the phantom line, the clockwise rotation of the ejecting main lever 107 may be interrupted. Abutting on the side face 112 of the 'V'-shaped projection 111 of the main lever 107 is one end 113 of the aforesaid lock-releasing lever 103 which faces the edge portion 54 of the locking lever 50 opposite to the angled portion 52 of the locking lever 50. Thus, the clockwise rotation of the main lever 107 will cause the lock releasing lever 103 to be pivoted by means of the side face 112 of the 'V'-shaped projection 111 as well as cause the locking lever 50 to be pivoted in a clockwise direction, thereby releasing the locking lever 50, when the lever 50 is in engagement with the notch portion 53 of the second sliding plate 36. (FIG. 11).

Figure 13:
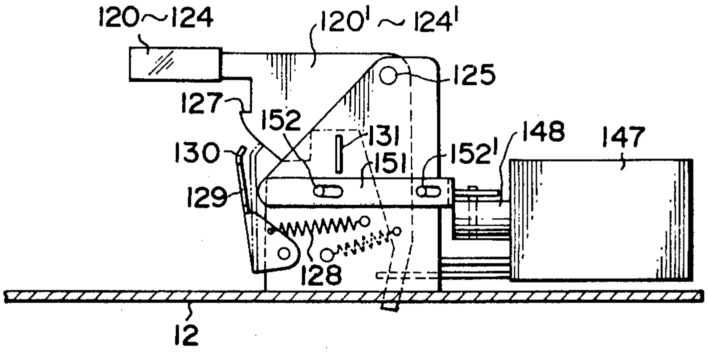
FIG. 13 is a cross-sectional view taken along the line XIII—XIII of FIG. 2.
Figure 14:
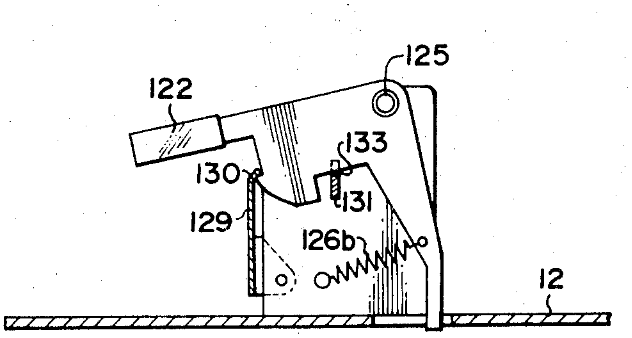
FIG. 14 is a cross-sectional view taken along the line XIV—XIV of FIG. 2.
Figure 15:
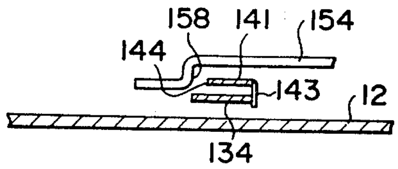
FIG. 15 is a cross-sectional view taken along the line XV—XV of FIG. 2.

Shown at 115 is an auxiliary ejecting lever which is pivotable about the pivot 108 and is urged under the action of a spring 116 in the counter-clockwise direction. Provided on one end of the auxiliary lever 115 is a pin 117 which is positioned under the undersurface of the cartridge casing 1. The auxiliary lever 115 is adapted to be pivoted in the clockwise direction by being urged by the pin 118 provided on the main lever 107 against the action of the spring 116. Shown at 119 is an attaching base for the ejecting mechanism 106. Shown at 120 is a recording operating button, at 121 a reproducing operating button, at 122 a rapid feeding operating button, at 123 a rewinding operating button, and at 124 a stop button, those buttons being each provided with operating levers 120', 121', 122', 123' and 124' which are pivotable about a pivot 125. The pivotable levers 120' through 124' are normally urged by means of a springs **126*a* through 126*e* so as to be pivoted in the clockwise direction. When thos levers are pivoted against the spring action of the springs, then the hook portions 127 defined in the pivotable levers (However, the hook portion is not defined in the lever 124) are engaged with the angled portions 130 of the locking plates 129 which tend to be pivoted in the clockwise direction under the action of a spring 128 and locked in a pivoted position. (FIGS. 13 and 14). Since the operation-stopping pivotable lever 124' is not provided with a hook portion 127, when the lever 124'** is pivoted, then locking of the other locked levers may be released.

Figure 12:
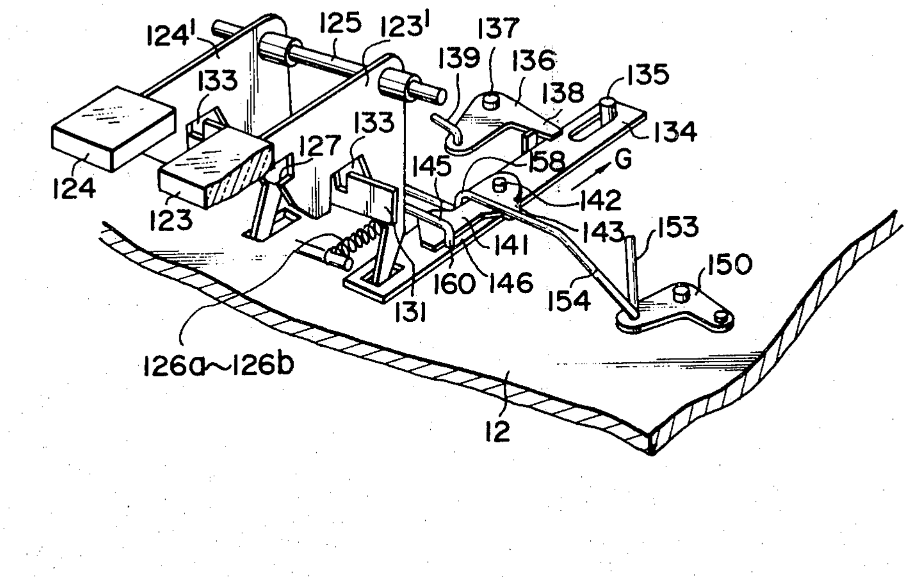
FIG. 12 is a perspective view of an operational push button portion.

Shown at 131 is a plate for stopping the rotation of the operating levers which is urged under the action of a compression spring 132 in an arrowed direction M in FIG. 3 and is slidable in a direction parallel to the aforesaid pivot 125, while there are provided notch portions in said levers 131 in such portions thereof facing respective operating levers 120' to 124'. In other words, when the stopping lever 131 is not moved from the position as shown in the drawing, the operating levers 120' to 124' are pivotable with the aid of the notch portions 133. However, when the stopping lever 131 is moved in a direction opposite to that shown by an arrow M, the rotation of the operating levers may be interrupted. Shown at 134 is a sliding lever coupled to a rewinding lever 123' as shown in FIG. 12, whereby the counterclockwise rotation of the rewinding lever causes the sliding lever 134 to be slid in an arrowed direction G. Shown at 136 is a lever pivotable about a pivot 136, one end thereof abutting on a tongue piece 138, and the other end thereof being coupled through a rod 139 and spring 140 to the pivotable lever 83, on which is mounted a deceleration pulley. When the sliding lever 134 slides in the arrowed direction G, the lever 136 will be pivoted in the counterclockwise direction, whereby the outer peripheral surface of the belt 34 may be urged under the pressure of the spring 140 against the outer peripheral surface of the turntable 4. In other words, when the round belt 84 is urged against the outer peripheral surface of the turntable then the turntable 4 will be rotated in the clockwise direction since the motor 78 is rotated in the counterclockwise direction, thus presenting a rewinding condition.

Shown at 141 is an auxiliary lever pivotably mounted by means of a pin 142 on the sliding plate 134, said lever 141 restricting the clockwise rotation of the auxiliary lever by means of a tongue portion 143. The auxiliary lever 141 is formed with a first cutout portion 144, projecting portion 145, and second cutout portion 146. Although not shown in the drawing, the lever 120', 121', 122' are coupled to a rapid feeding mechanism of a tape take-up mechanism. Shown at 147 is an auto-stop electromagnet whose plunger 148 is coupled to two pivotable levers 149, 150, and the attraction of the plunger 148 causes the lever 149 to be pivoted in the clockwise direction as well as the lever 150 to be pivoted in the counterclockwise direction. Shown at 151 is a lock-releasing lever for operating levers 121' through 124', said lever 151 being slidably mounted on pivots 152 and 152', one end thereof abutting on the aforesaid lever locking plate 129, and the other end thereof abutting on the lever 149, whereby the attraction of the plunger 148 will cause the lock releasing lever 151 to urge the locking plate 128, thereby releasing the operating levers 121' through 124' from being locked, while stopping all operations. Coupled to the lever 150 are pivotable rods 153 and 154, the rod 153 being linked through a pivotable lever 155 and rod 156 to the auxiliary lever 27 provided on the first sliding plate 24, whereby the attraction of the plunger 148 will pivot the auxiliary lever 27 in the clockwise direction. The rod 154 may be slid in an arrowed direction I as shown in FIG. 3 and may be extended through an operating lever base plate 157 and is formed with an angled portion 158 as shown in FIG. 12, said angled portion 158 facing the first cutout portion 144 in the auxiliary lever 141, (See FIG. 15).

Figure 16:
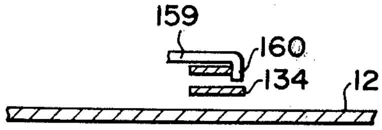
FIG. 16 is a cross-sectional view taken along the line XVI—XVI of FIG. 2.
Figure 17:
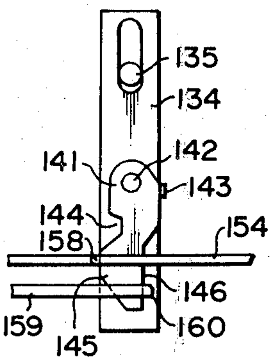
FIG. 17 is an enlarged paln view of an operational push button portion.

On the other hand, a rod 159 is engaged with an angled portion 49 of the lever 46, the other bent portion 160 being abutted against the second cutout portion 146 in the auxiliary lever 141, (See FIGS. 12 and 16). When the rewinding button 123 is pushed to move a sliding plate 134 in the arrowed direction G, then the first cutout portion 144 in the auxiliary lever 141 will be averted from the position facing the bent portion 158 of the rod 154, and the projecting portion 145 will be abutted aginst the angled portion 158, (See FIG. 17). However, the angled portion 160 of the rod 159 still remains abutting the second cutout portion 146. As shown in FIGS. 3 and 12, the auxiliary lever 141 will not be pivoted, even if the plunger 148 is pulled, when the angled portion 158 of the rod 154 corresponds to the first cutout portion 144. On the other hand, as shown in FIG. 17, where the plunger 148 is pulled, when the projecting portion 145 is abutted against the angled portion of the rod 154, then the angled portion 158 will urge the projecting portion 145 to cause the second cutout portion 146 to be urged against the bent portion 160 of the rod 159, thereby shifting the rod 159 in an arrowed direction J (FIG. 3), so that the lever 46 will be pivoted as shown in FIG. 11.

Shown at 161 in FIG. 3 is a lever pivotable about a pivot 162, one end thereof being coupled through a rod 163 to the arm 70 of the brake releasing lever 71, and the other end thereof being abutted against the end portion of the lever 131, while the clockwise rotation of the brake releasing lever 71 causes the lever 161 to be pivoted in the counterclockwise direction, whereby the lever 131 may be slid against the action of the compression spring 132. The sliding of the lever 131 will disengage the respective operating levers 120' through 124' from the notches 133 in the lever 131, thereby interrupting the rotation of the respective operating lever.

Shown at 164 in FIG. 3 is an 'L'-shaped lever pivotable about the pivot 165, one end thereof being engaged with a pin 56 provided on the second sliding plate 36, and the other end thereof being coupled through a rod 168 to one end of the lever 167 pivotable about the pivot 166. The other end of the lever 167 is abutted against a locking plate 129 of the aforesaid operating lever, whereby the sliding of the second sliding plate 36 in the arrowed direction F will cause the lever 164 to be pivoted in counterclockwise direction. However, in case the second sliding lever 36 is not sliding, the locking plate 129 is inclined by means of the lever 167 as shown by the slid line in FIG. 13, thereby preventing the operating levers 120' through 124' to be locked.

Shown at 174*a*, 174*b*, 174*c*, 174*d*, 174*e*, 174*f*, and 174*g* are microswitches, in which the microswitches 174*a*, 174*b* are adapted to be actuated by means of a recording operating button 120, the microswitches 174*b*, 174*c* by means of the reproducing button 121, the microswitches 174*d*, 174*e* by means of rapid feeding button 122 and the microswitches 174*e*, 174*f*, 174*g* by means of a rewinding button, respectively. The switching mechanism is not shown. Shown at 175 is a microswitch adapted to be actuated only when the first sliding plate 24 is slid in the arrowed direction F. Shown at 234 is a microswitch adapted to be actuated in association with the sliding movement of the second sliding plate 36, said microswitch 234 being normally released (See FIGS. 2, 3) and being adapted to be switched over when the second sliding plate 36 is slid in the arrowed direction F. Shown at 235 is a tape counter as used in a tape recorder and the like, said counter being connected through a belt to the turntable 4 (See FIG. 3) and adapted to count the amount of the feeding of the tape from the supply reel. Shown at 237 is a reset lever, whereby by pulling the lever in an arrowed direction Z, the counter is reset to 'zero.' Shown at 238 is an electromagnet, and the plunger 240 is coupled through a rod 239 to the aforesaid reset lever 237, whereby when the plunger is pulled, the counter 235 is reset. The operating circuit of the aforesaid electromagnet 238 will be described hereinafter. As willl be explained, the plunger is pulled while the microswitch 175 is switched on, and on the other hand, the electromagnet is released simultaneously with release of microswitch 175.

The portion encompassed with a phantom line will be described with reference to FIGS. 21 and 22. Shown at 180 is a head cylinder assembly for two head type VTR, at 181 a tape leader guide, the cross sectional configuration of the tape leader guide being shown in FIG. 23, in which the width $W_1$ is substantially equal to the width $W_2$ of the magnetic tape 105, and $W_2$ is substantially equal to the width of the tape leader 106. One end of the tape leader guide 181 faces a tape feeding opening 176 in the cartridge, while the other end thereof faces a capstan 182 and a pinch roller 183. In other words, the tape leader fed from the reel by the loading operation is passed through a groove having width $W_2$ in the leader guide and introduced to the take-up reel, which will be described hereinafter. When the tape leader of a predetermined length is fed and the magnetic tape bonded thereto appears, then the magnetic tape will be disengaged from the leader guide 181 and than be wound around the head cylinder 180 as shown by the phantom line 184, thereby stopping the loading by means of an electric timer which will be described herinafter. Shown at 185, 186, 187 are tape guide posts having a circular cross section, at 188 an erasing head, at 189 a head for controlling the audio signals, at 190 a lamp and at 191 a photo-transistor positioned so as to face the lamp 190 through the leader guide 181. Provided in this portion of the leader guide 180 is a cutout 192, through which light may be transmitted as shown in FIG. 23, therby discriminating between the transparent tape leader and the magnetic tape.

A capstan 182 is rotatably journaled in a bearing 193 and has a small-diameter pulley 194 and a large diameter pulley 195. A flat belt 171 is trained around the large-diameter pulley 195 and is adapted to rotate the capstan 182 in the counterclockwise direction. A pinch roller 183 is rotatably mounted on a pivotable arm 196, which is formed with a tongue piece 197.

Shown at 198 is an auxiliary lever adapted to urge the pinch roller, the lever 198 being pivotable about a pivot 199, one end of said lever 198 being engaged with the aforesaid tongue piece 197 and the other angled end 200 thereof being abutted against a circular projection 202 provided on the main lever for urging the pinch roller. The main lever 201 is pivotable about a pivot 203, one end thereof being engaged with a plunger 205 of the electromagnet 204. Shown at 206 is a spring secured between the main lever 201 and the auxiliary lever 198, said spring being adapted to present an urging pressure for the pinch roller. Shown at 207 is a microswitch, and an actuator 208 thereof is normally urged by means of the main lever 201 adapted to urge the pinch roller. The microswitch 207 is so positioned as to be switched over by the release of the actuator due to the attraction of the plunger. Shown at 209 is a take-up turntable which is rotatable, and at 210 is a friction pulley which is urged against the take-up turntable 209 through a felt 211 under the action of a spring 212, said pulley 210 being rotatable coaxially with the turntable 209. In other words, the rotational force of the turntable 209 drives the friction pulley 210. Shown at 213 is a take-up reel which is fitted on a reel shaft 214 and is rotated together with the turntable 209. Shown at 215 is an idler adapted to transmit the rotational force to the take-up reel during recording or reproducing. The idler is rotatably mounted on an arm 216 which is pivotable itself, while a round belt 217 is trained between the idler 215 and a small-diameter pulley 194 provided on the capstan 182. The arm 216 is normally urged in the clockwise direction under the action of spring 216' secured between the main lever 201 and the arm 216, while part of the arm 219 is abutted against the angled portion 200 of the pinch roller urging auxiliary lever 198, thereby restricting the aforesaid rotation. Shown at 218 is a tape leader winding lever, one end thereof being adapted to be pivoted about a pivot 219 and the other end thereof being provided with a rotatable rubber roller 220 which is urged by means of a spring 221 against a reel hub 222. Shown at 223 is a microswitch adapted to be actuated by the winding lever 218, whereby the actuator 224 is urged when the tape is not to be wound around the reel hub 222, and the lever 218 is pivoted in the counterclockwise direction while the tape is wound around the reel, so that the actuator 224 will be released from being urged when a given length of tape has been wound around the reel, whereupon the microswitch will be switched over.

Shown at 225 is an arcuate leader-tape guide plate provided on the outer peripheral portion of the reel 213. Shown at 226 is a brake lever which is pivotable about the pivot 227, the lever 226 urging a brake shoe 229 against the turntable 209 by means of a spring 228. The brake lever 226 is adapted to be pivoted in the clockwise direction in interlocking with the counter-clockwise rotation of the brake lever 74. Shown at 230 is a microswitch adapted to be actuated by means of the rotation of the brake lever 226, whereby the actuator is released when the brake shoe 229 is urged against the turntable 209. The actuator is urged to switch over the switch, when the brake lever 226 is pivoted in the clockwise direction and the brake lever 226 is pivoted in the clockwise direction, the brake shoe 229 thereby being disengaged from the reel turntable 209. Shown at 232 is a rapid-feeding rubber roller which is rotatably mounted on a lever 233 which is also pivotable and is disengaged from the turntable 209 normally, whereby when the aforesaid rapid feeding button is pushed, the roller 232 is urged against the turntable 209 to directly engage with the friction pulley 210. An electromagnet 204 is so connected electrically as to be actuated, when the reproducing button 121 is depressed. In other words, when the button 121 is pressed, the pinch roller urging main lever 201 coupled to the plunger 205 will be rotated in the counter-clockwise direction, while the pinch roller urging auxiliary lever 198 engaging the lever 201 will be rotated in the clockwise direction, and then the pinch roller 183 will be urged against the capstan 182. With the rotation of the auxiliary lever 198, the lever 216 will be rotated in the clockwise direction, so that the outer peripheral surface of the round belt 217 will be urged against the outer peripheral surface of the friction pulley, thereby rotating the reel mount in the clockwise direction in order to wind the tape. Although the lever 216 is not shown, the lever 216 is adapted to interlock with the aforesaid loading operation to thereby rotate the turntable 209.

In operation, when a cartridge 2 is inserted into the casing 1 from the condition as shown in FIG. 5, the cartridge detecting sliding lever 6 will slide in the arrowed direction A, and the post 63 is pressed by the inclined cam surface 7 formed in the sliding lever 6, such that the cartridge-detecting lever 58 will rotate against the action of the spring 64 in the counterclockwise direction. When the lever rotates, the locking condition of the auxiliary levers 27 and 39 provided on the first and second sliding plates 24 and 36 will be released, whereby the levers 27 and 39 will rotate in a counter-clockwise direction under the action of springs 29 and 45, until the 'V' projections 33 and 43 on the auxiliary levers 27 and 39 are brought to positions where said projections face the pins 22 and 23 on the main lever 20. FIG. 18 shows the condition of the cartridge being inserted in the casing 1. As is clear from the drawing, the reel contacts the bottom surface of the cartridge casing 100. When the cartridge casing is urged in the arrowed direction B until the locking piece 11 provided on the undersurface of the casing engages the locking pin 92 on the locking lever 93 and when the cartridge casing is released from the pressed state, the reel may be held positively under the resilient force of the reel shaft 102 thereon, while the cartridge casing 100, together with the casing 1, will move upwards under the spring force of the pantograph but against the action of a spring 95 by the distance *t* corresponding to the clearance in the elongated hole in the locking lever shaft, and thereby the reel will be held on the reel shaft without contacting the internal surface of the cartridge, as shown in FIG. 19. At this time, the microswitch 99, which has been urged by means of the tongue portion 97 of the locking lever 93, will be actuated.

On the other hand, since the main lever 20 is rotated with the downward movement of the cartridge by virtue of the engagement with the projection 19 on the lever 15, the 'V' shaped projections 33 and 43 on the auxiliary levers 27 and 39 will be urged by means of pins 22 and 23, whereby the first and second sliding plates 24 and 36 will slide in the arrowed direction F against the action of springs 26 and 38. When the first sliding plates 24 slide, the bent portion 35 will be disengaged from the lever 91, so that the lever 90 will rotate in a clockwse direction under the action of the spring 89 to thereby bring the spur gear 81 into engagement with the loading gear 85 and press the rubber roller 86 against the turntable 4, while the microswitch 175 will be actuated. Besides the above-mentioned operation, when the first sliding plate 24 is slid, the 'V' shaped lever 66 will be rotated, so that the brake levers 74 and 226 will be rotated, and thereby the brake shoes 76 and 229 will be disengaged from the turntable 209, and the microswitch 230 will be actuated. On the other hand, since the sliding plate 131 is urged in an arrowed direction n by means of a lever 161, the urging operation of the operating buttons will become impossible. Since the microswitch 234 is actuated by the sliding movement of the second sliding plate 36 and the lever 46 shifts from the position shown by the solid line to the position shown by the phantom line, as shown in FIG. 9, the rotation of the main lever 107 may be interrupted, thereby preventing the cartridge from being ejected during the loading operation.

Simultaneously therewith, the levers 164 and 167 will rotate in a counterclockwise direction by means of pins 56 provided on the edge portion of the second sliding plate 36, respectively, so that the locking plate 129 for the operating lever will be freed. More particularly, the locking plate 129 will be in the condition shown by the phantom line in FIG. 13, and thereby the respective levers are locked.

The aforesaid microswitch 99 operates in interlocking relation with the descending movement of the cartridge casing 1, and will be operated by means of the locking lever 93, when the cartridge casing 1 descends to the lowered position, positively. However, since the microswitch 99 may be actuated, even if the cartridge casing 1 descends, with the cartridge 2 being not loaded in the cartridge casing 1, there is separately provided a microswitch 234 adapted to interlock with the second sliding plate 36. This microswitch 234 will not be actuated, even if the cartridge casing 1 descends, if the cartridge 2 is not loaded in the cartridge casing 1, since the second sliding plate 36 does not slide. On the other hand, the microswitch 234 will be actuated, when the cartridge casing 1 descends, with the cartridge 2 being loaded in the cartridge housing 1. Since the microswitch 234 is actuated, when the cartridge 2 is loaded in the cartridge casing 1 and yet the movement of the casing 1 is nearly completed, an AND circuit consisting of the microswitch 99 and 234 may be provided, whereby when the cartridge 2 is loaded in the cartridge casing 1 and the cartridge casing 1 positively descends, an electric source may be connected to the microswitches 230 and 174*a*. If a single microswitch is used in place of two microswitches 99 and 234, for instance, in the case of the use of the microswitch 99 alone, irrespective of whether or not the cartridge casing 1 is loaded with cartridge 2, the microswitch 99 will unfavorably be actuated due to the positive descending movement of the cartridge casing 1. On the other hand, in the case where only the microswitch 234 is used, the microswitch 234 may be actuated, when the cartridge 2 is housed in the cartridge casing 1 and yet the movement of the casing 1 is nearly completed. Accordingly, the leader tape is payed out in the state that the height of the leader tape guide 181 is not flush with the height of the tape exit 173 of cartridge 2. This unfavorably prevents movement of the leader tape at the inlet of the leader tape guide 181.

Figure 21:
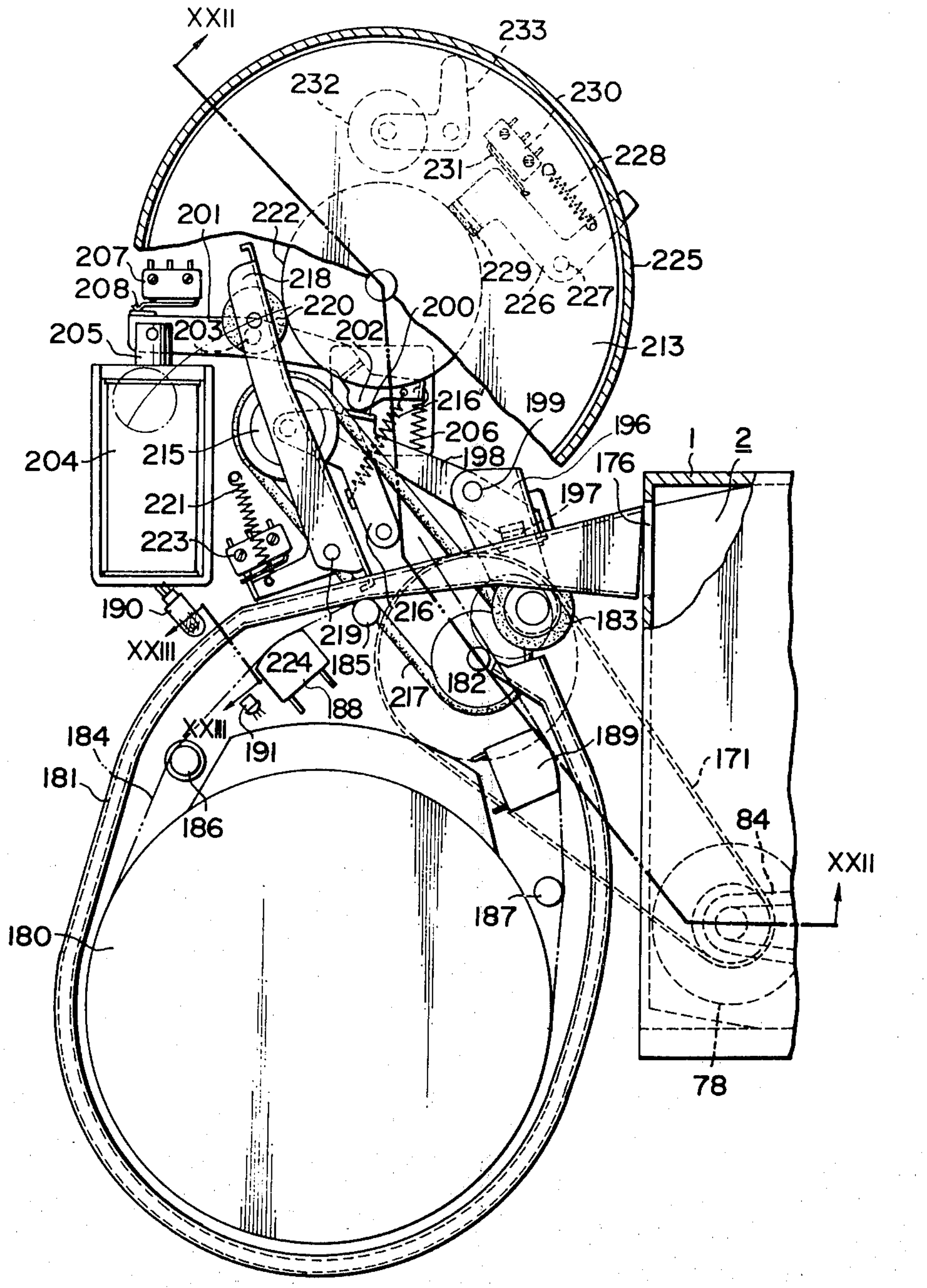
FIG. 21 is a detailed plan view of a portion encompassed with phantom line XXI of FIG. 1.
Figures 22, 23:
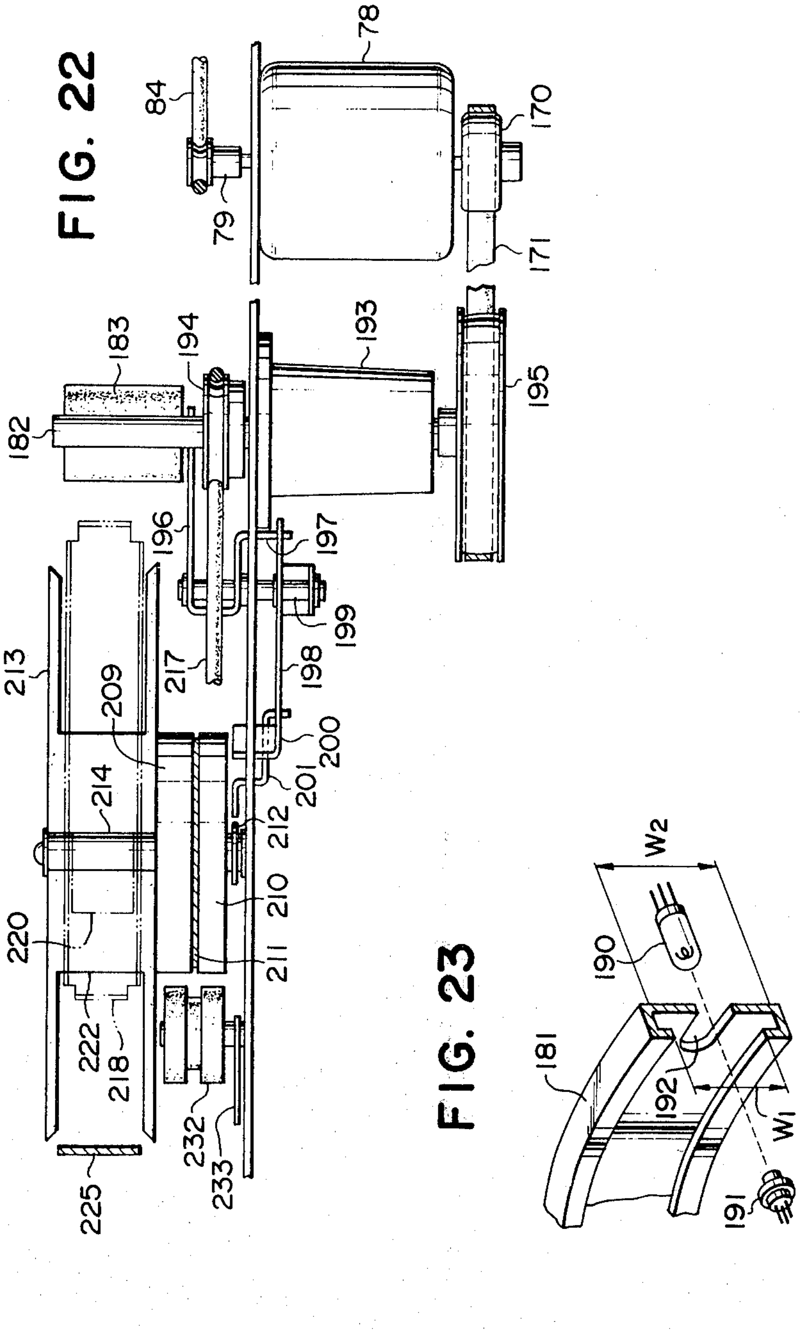
FIG. 22 is a cross-sectional view taken along the line XXII—XXII of FIG. 21.
FIG. 23 is a perspective cross-sectional view taken along the line XXIII—XXIII of FIG. 21.

The leader tape which is paid out from the cartridge 2 in a loading condition as shown in FIG. 21 passes through the leader guide 181, then is guided by the leader tape winding lever 218 and guide plate 225, and wound around the take-up reel 213, thereby the auto-loading being commenced.

Figure 24:
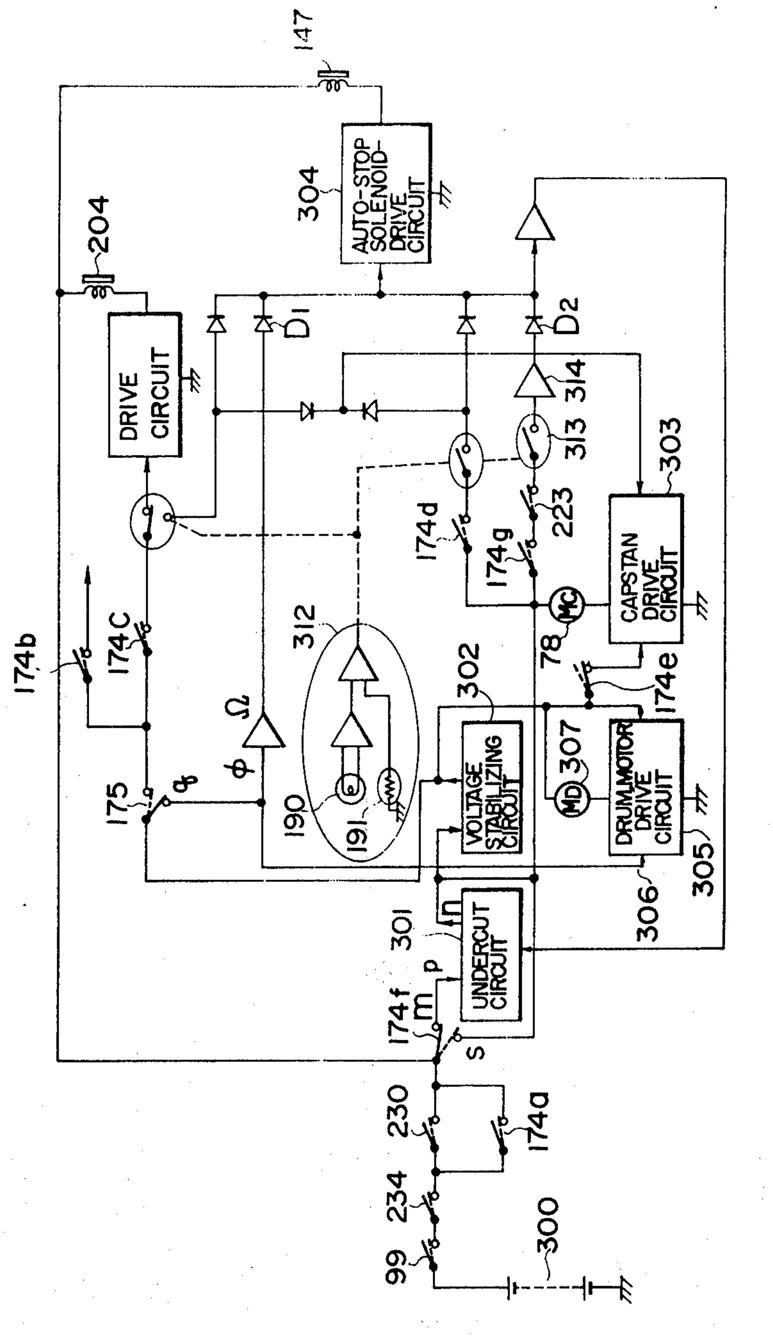
FIG. 24 is a diagram showing one example of an electric control circuit of the present invention.

In FIG. 24, as has been described earlier, the microswitches 99 and 234 cooperate with the microswitch 230, and the microswitch 174*b* which is adapted to be switched over in interlocking relation with the rewinding button is mechanically locked during the loading, so that this microswitch has been switched to the *m* side, with the result that the voltage supplied from the battery 300 is impressed on the input terminal *p* of the undercut circuit 310 provided for preventing the overdischarge of the battery 300. The undercut circuit 301 impresses voltage, as an output, to the output terminal *n*, as long as the voltage supplied from the battery 300 is over the predetermined value, and thus supplies voltage to the capstan motor 78, while supplying voltage to the voltage stabilizing circuit 302. The output voltage which has been stabilized in the voltage stabilizing circuit 302 passes through the microswitch 174*e* adapted to be released only at the time of rapid feeding and the operation of the rewinding button, while voltage is supplied to the capstan drive circuit 303. The motor 78 is put in motion and the leader tape is paid out from the cartridge 1 mounted on the turntable, and thus loading is commenced.

Figure 27:
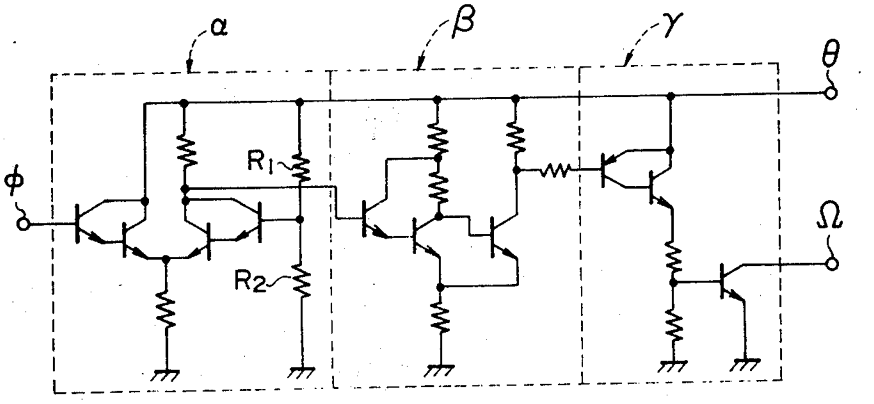
FIG. 27 is an electric wiring diagram showing one example of a circuit for detecting a level of an input voltage level.
Figure 28:
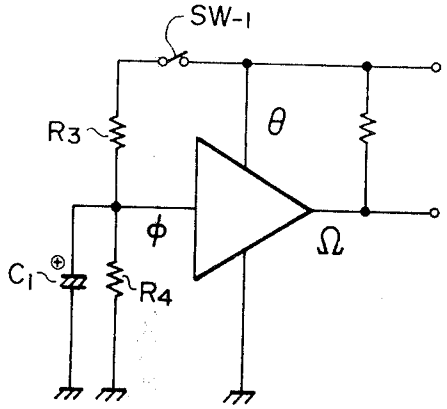
FIG. 28 is an electric wiring diagram showing one example of a delay circuit which is CR connected with the input terminal of said circuit for detecting the level of the input voltage level.
Figure 29:
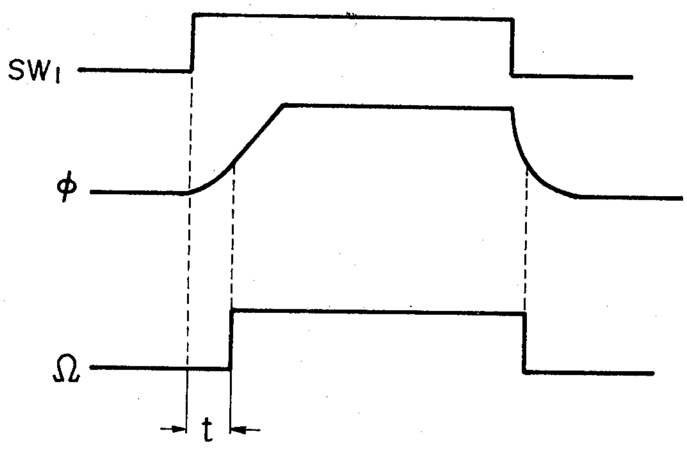
FIG. 29 is a view showing wave forms in said delay circuit.
Figure 29:
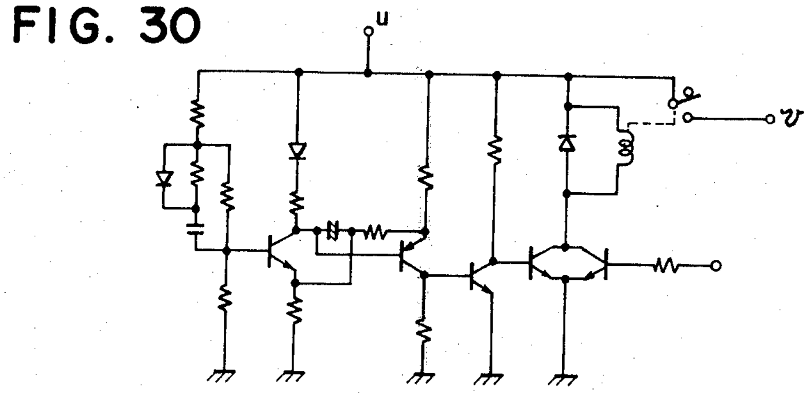

A circuit as shown in FIG. 27 is a level circuit. The portion $\alpha$ encompassed with a broken line $\alpha$ represents a differential amplifier, $\beta$ a Schmidt circuit, $\gamma$ a drive circuit, terminal $\phi$ an input terminal, $\theta$ an electric power source terminal, and $\Omega$ does an output terminal, thereby forming a timing circuit as shown in FIG. 28. Referring to FIG. 27, the resistors $R_1$ and $R_2$ of the differential amplifier $\alpha$ are provided for setting the input level, whereby there may be set an input level for the output ON corresponding to the fractional resistance ratio of $R_1$ and $R_2$. FIG. 29 shows the input and output wave forms for the timer circuit as shown in FIG. 28. When the switch SW-1 is put to 'ON,' then the voltage at the input $\phi$ will be gradually increased due to the time constant due to $R_3C_1$. When the voltage of input $\phi$ reaches the voltage set by means of resistors $R_1$ and $R_2$ as shown in FIG. 27, there may be obtained at output terminal $\Omega$ a signal as shown in FIG. 29. The output signal from the output terminal $\Omega$ will pass through a diode $D_1$, thereby driving the auto-stop-solenoid-drive circuit 304 and thus the electromagnet 147 used for stopping is energized whereby the plunger 148 will be attracted.

Figure 20:
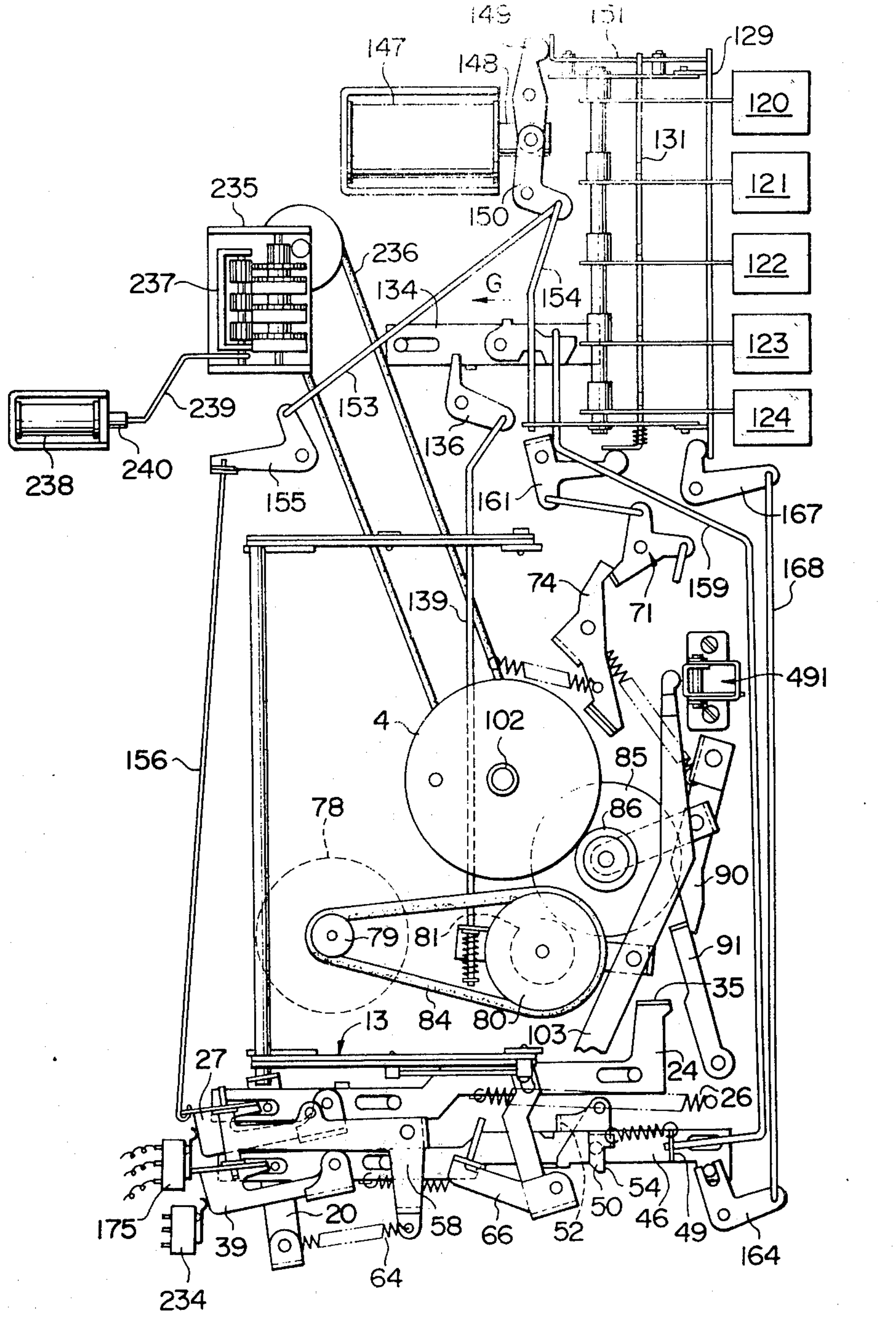
FIG. 20 is a view showing another operating condition of FIG. 3.
Figure 25:
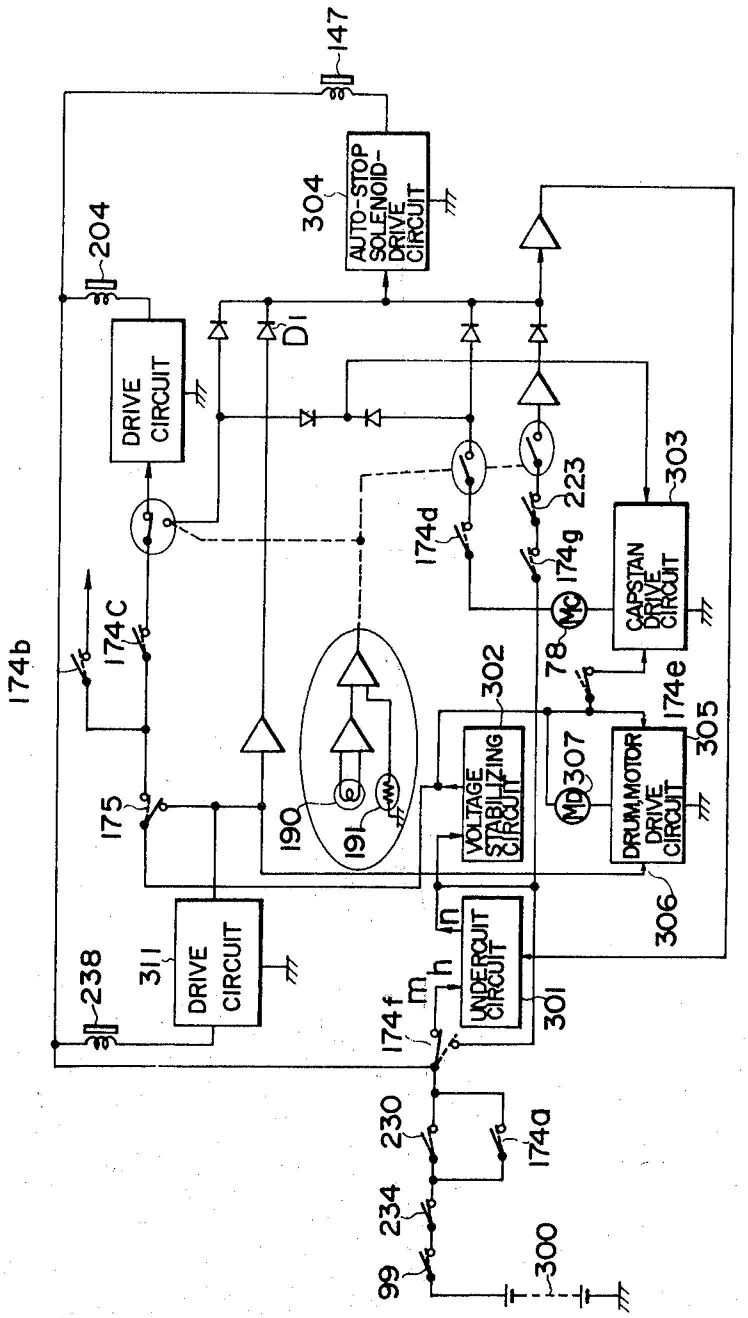
FIG. 25 is a diagram showing an electric control circuit, in which a counter reset means is added to said control circuit of FIG. 24.

When the plunger 148 is attracted, then the lever 150 will rotate, the auxiliary lever 27 on the first sliding plate coupled thereto by rod 153, lever 155, rod 156 will rotate against the action of the spring 29 in a clockwise direction, thereby disengaging 'V'-shaped projection 33 from pin 22, so that only the first sliding plate 24 will be restored under the action of spring 26 from the condition shown in FIG. 20, while, in cooperation with the aforesaid restoring operation, the loading gear 85 and rubber roller 86 will be detached therefrom and thus the auto-loading may be stopped. When the first sliding plate 24 is restored, then the brake shoe 76 will be urged against the reel mount 4, and the pressing of the operating button may become possible, while the microswitch 175 will be released. As a result, the electricity-feeding to the electromagnet 238 will be stopped, and the counter will be brought to an operative condition. According to the present embodiment, the counter is maintained in a reset condition during a period from the beginning to the completion of the loading operation. However, as shown in FIG. 25, the electromagnet 238 may be energized by using a drive circuit 311 and reset by operating same until the completion of the loading operation. Although the loading device is in electric engagement with the counter, it may readily be inferred that the mechanical method may be substituted for the former.

Figure 26:
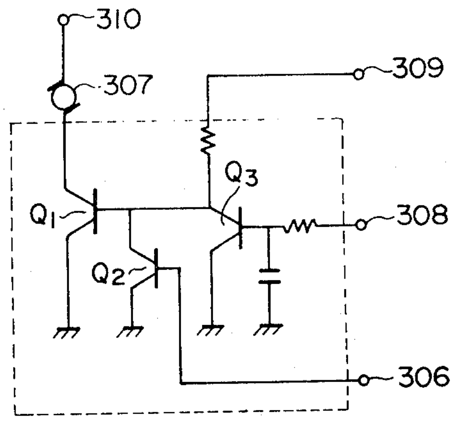
FIG. 26 is a diagram showing a motor drive circuit.

The microswitch 175 which is adapted to be actuated in cooperation with the first sliding plate 24 during loading, has been switched to the ⋕ contact *q*, and a voltage is supplied to the motor stopping terminal 306 of the drum motor drive circuit 305 (FIGS. 24, 25 and 26), while the rotation of the head drum drive motor 307 is stopped. In FIG. 26, shown at $Q_1$ is a transistor series connected to the motor 307, said transistor being adapted to be brought into conductive condition depending on the level of the base voltage at $Q_1$ to thereby supply the voltage to the terminal 306. On the other hand, when the voltages is supplied to the terminal 306, the transistor $Q_2$ will be brought into conductive condition, thereby lowering the base voltage at transistor $Q_1$ to the ground voltage. This then causes the transistor $Q_1$ to be blocked and the motor 307 to be stopped. When the input voltage is not applied to the input terminal 308 in FIG. 26 and power source voltage is supplied to the terminals 309 and 310, while the voltage is not supplied to the terminal 306, then the transistor $Q_3$ will be blocked, whereas the transistor $Q_1$ will be brought into conductive condition, thereby rotating motor 307.

The aforesaid description may apply to the capstan motor 78 and capstan motor drive circuit 303. In this manner, upon completion of auto-loading, the microswitch 175 is switched to S, thereby operating the button for reproducing and rapid feeding for the intended purpose.

A description will now be given of the removing operation of the cartridge from the cartridge casing, upon completion of the desired operation, such as reproducing. First, when the rewinding button 123 is depressed, as shown in FIG. 12, the sliding plate 134 will shift in an arrow direction G to thereby rotate the lever 136, while bringing the outer peripheral surface of the belt on the deceleration pulley 80 into urging relation against the reel mount 4, whereby the reel mount 4 may be rotated in a clockwise direction to rewind the tape around the reel 101. Although not shown in the drawing, it is apparent that the brake 76 should be detached from the reel mount, in cooperating with the rewinding operation. Upon completion of the rewinding operation, the microswitch 223 will be actuated (which is adapted to be actuated in cooperation with the lever 213 provided on the rewinding reel 213) while the microswitch 174 will be connected to S, microswitch 174 being adapted to be actuated in association with the rewinding operation. Then, when the switch 313 is brought into a conductive condition, said switch will be adapted to be actuated in cooperation with the photosensor circuit (FIG. 24). This causes the rewinding time delay circuit 314, after lapse of the setting time, to drive the stop electromagnet drive circuit 304 through the diode circuit $D_2$, while actuating the stop electromagnet 147, whereby the rod will be shifted in an arrow direction I through the lever 150 by virtue of the operation of the aforesaid electromagnet. However, since the operating button is in the rewound condition, the bent portion 158 of the rod 154 abuts the recessed portion of the auxiliary lever 141 as shown in FIG. 17, such that the shifting of the rod 154 in an arrow direction I will cause the auxiliary lever 141 to rotate in a counterclockwise direction to thereby pull the rod 159 in an arrow direction J by means of the second recessed portion 146, whereby the ejecting-mechanism stop lever 47 is rotated through a given angle in a counterclockwise direction as shown in FIG. 11 and held in position by means of the locking lever 50 engaging the notch portion 53 in the second sliding plate 36.

When the ejecting main lever 107 is urged and rotated, the cartridge casing lock releasing lever 103 will be rotated by means of the side face 112 of the 'V' shaped projection 111, thereby releasing the locking by the locking lever 93, after which the auxiliary ejecting lever 115 is rotated by means of pin 118 provided on the main lever 107, and then the undersurface of the casing 1 is pushed upwards by means of pin 117 provided on the tip portion of the auxiliary ejecting lever 155, then the reel which has been press-fitted in the reel shaft is forcedly withdrawn together with the cartridge. After the withdrawal, the reel may be raised up to the given uppermost position under the spring action of the pantograph. Simultaneously therewith, the 'V' shaped projection on the ejecting main lever 107 urges one of the locking levers 54 provided on the ejecting-mechanism-operation-stop-lever 46, thereby releasing the engagement of the lever 50 with the notch portion 53, while bringing the stop lever 46 to the initial position. When the cartridge casing ascends due to the aforesaid ejecting operation, then the second sliding plate 36 will return to its home position, such that the lever 164 will be rotated in a clockwise direction again, thereby rotating the locking plate of the operating lever, thus preventing locking of the operating lever. Next, when the cartridge is removed, the cartridge detecting lever 6, detecting and-rotating lever 68, auxiliary levers 27 and 39 will all return to the initial conditions.

A description has been given of the operation, where the cartridge is inserted into the cartridge casing which is then urged in an arrow direction B. When the cartridge casing is urged, without the cartridge being inserted therein, then the cartridge-detecting sliding lever 6 and detecting and rotating lever 68 will not be operated, so that the auxiliary levers 27 and 39 will not be rotated, while only the main lever 20 will rotate, with the other mechanisms remaining inoperative. In other words, auto-loading or other operations may be effected, only when the cartridge is inserted in the casing, yet the casing is lowered to a predetermined position. Even if the cartridge is inserted in the casing, unless the casing descends, the first and second sliding plates will not be operated, such that the locking of the operating button, as well as the operations such as recording, reproducing, rapid feeding and rewinding will not be effected.

As is apparent from the foregoing description, according to the present invention, the reel mount is rotated automatically to thereby pay out the leader tape, so that there will be no misoperation resulting from inaccurate engagement of the supply reel with the turntable or from the improper mounting of the cartridge.

What is claimed is:

1. An apparatus for recording and reproducing audio and video signals and for receiving a cartridge housing a reel, said reel having wound therearound a magnetic tape with a leading end bonded to a leader tape, and in which said magnetic tape threads under the guidance of said leader tape through a predetermined path running through a magnetic tape transfer system and a group of transducers including rotating heads, thereby providing a recording reproducible condition, said apparatus comprising:

a. carriage means movable between a non-playing position and a playing position for receiving said cartridge in said non-playing position and making the cartridge thus received engage with a turntable for a supply reel by shifting said cartridge to said playing position;

b. cartridge detecting means for detecting the reception of said cartridge in said carriage means;

c. shifting movement detecting means for detecting the shifting movement of said carriage from said non-playing position to said playing position;

d. a leader tape pay-out mechanism for rotatably driving said supply reel so as to pay out said leader tape outside of said cartridge, said mechanism being capable of assuming an operative position, in which said mechanism abuts on said turntable for said supply reel and is permitted to rotate said turntable, and of assuming an inoperative position, in which said mechanism is retracted from said turntable and is not permitted to rotate said turntable;

e. a power source for supplying driving power to said leader tape pay-out mechanism;

f. leader tape pay-out mechanism control means which controls the position of said leader tape pay-out mechanism in response to the conditions detected by said cartridge detecting means and said shifting movement detecting means, and which brings said leader tape pay-out mechanism to said operative position only when said cartridge detecting means detects the reception of said cartridge in said carriage means and also said shifting movement detecting means detects the shifting movement of said carriage from said non-playing position to said playing position; and g. resetting means for cancelling the conditions of said shifting movement detecting means in the case where the shifting movement of said carriage is detected, and reset said detecting means to the conditions prior to detecting said shifting movement.

2. An apparatus for recording and reproducing audio and video signals as claimed in claim 1, said apparatus further comprising locking means for locking said carriage means in said playing position; locking detecting means for detecting the locking conditions of said locking means; and power source control means for operating said power source only when said locking detecting means detects the locking conditions of said locking means.

3. An apparatus for recording and reproducing audio and video signals as claimed in claim 1, said apparatus further comprising leader tape pay-out detecting means for detecting that said leader tape pay-out mechanism is in said operative position, and rotating head motor control means for controlling so as to bring to an inoperative condition said rotating head motor which drives and rotates said rotating heads when said leader tape pay-out detecting means detects that said leader tape pay-out mechanism is in said operative position.

4. An apparatus for recording and reproducing audio and video signals as claimed in claim 1, said apparatus further comprising leader tape pay-out detecting means for detecting that said leader tape pay-out mechanism is in said operative position, and control means which operates so as not to permit the operation of means for operating said magnetic tape transfer system and a group of transducers in response to the conditions detected by said leader tape pay-out detecting means.

5. An apparatus for recording and reproducing audio and video signals as claimed in claim 1, said apparatus further comprising signal generating means which generates a signal at a timing associated with the completion of the threading of said magnetic tape into said predetermined path, after the paying-out of said leader tape; and actuating means for actuating said resetting means in response to said signal from said signal generating means.

6. An apparatus for recording and reproducing audio and video signals as claimed in claim 5, said apparatus further comprising automatic stopping means for shifting to a stop mode said magnetic tape transfer system and said group of transducers.

* * * * *